Sept. 29, 1970         H. HUEBSCHER         3,531,801
SIGNAL PROCESSING APPARATUS
Filed May 29, 1968                                2 Sheets-Sheet 1
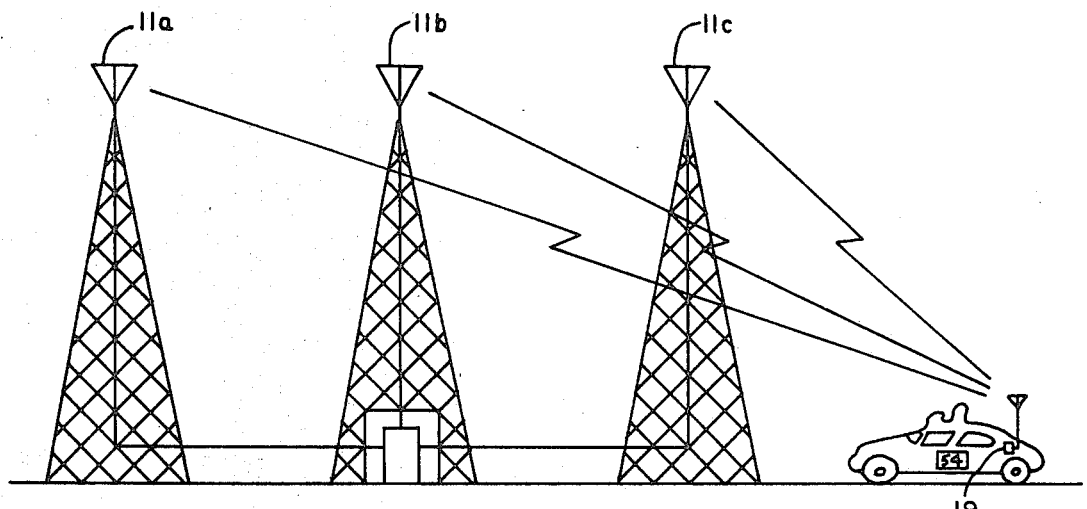
FIG. 1
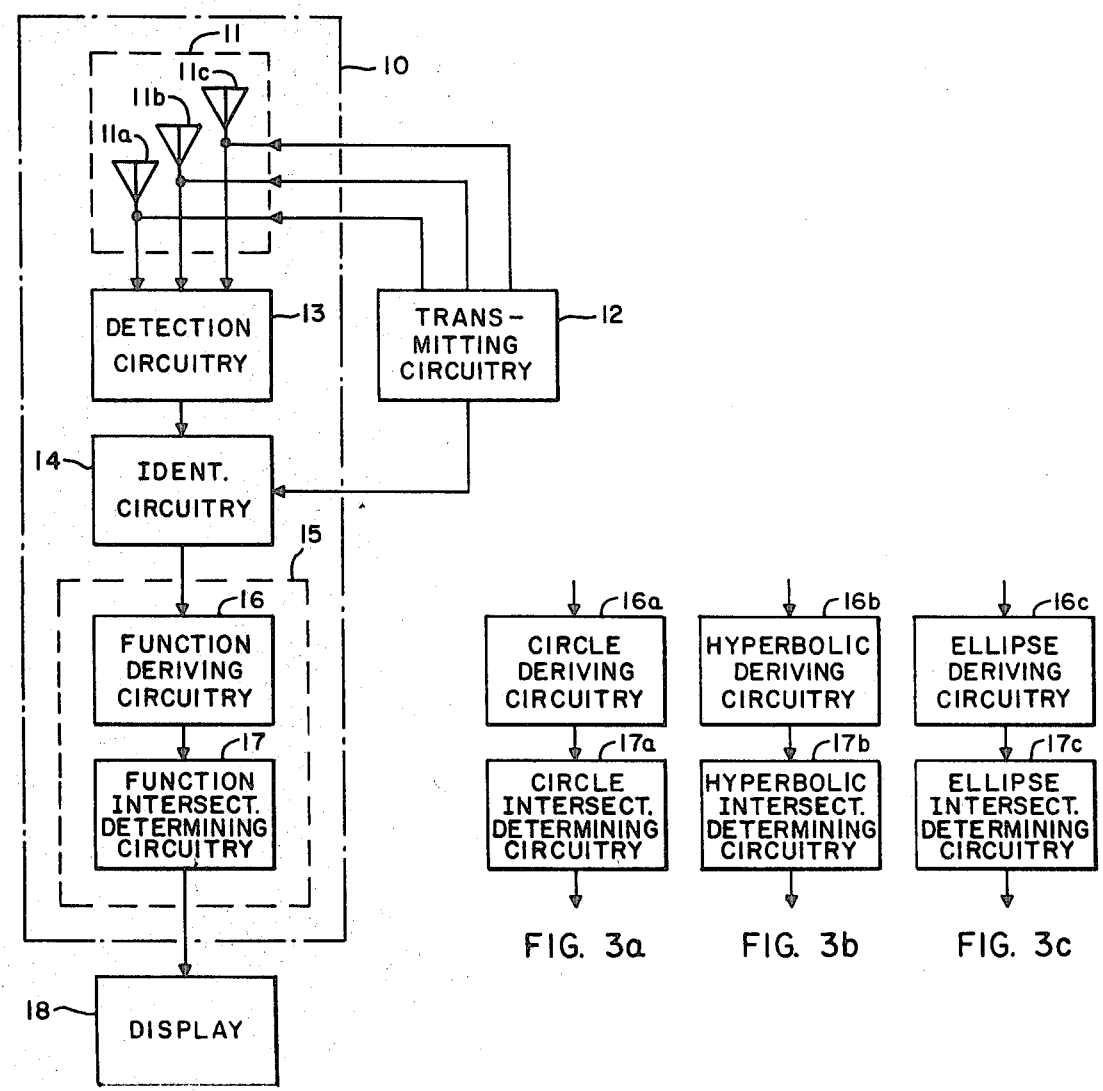
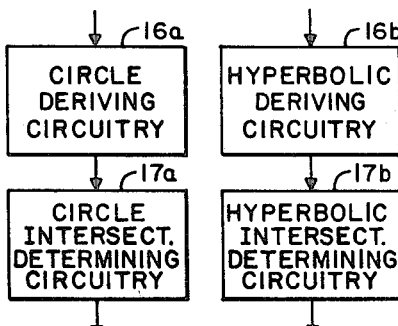
FIG. 3a
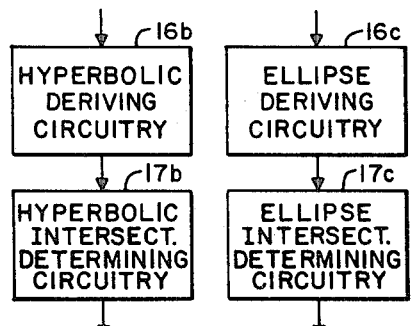
FIG. 3b
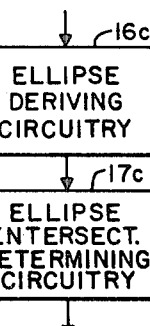
FIG. 3c ns patent office
3,531,801
Patented Sept. 29, 1970

3,531,801
SIGNAL PROCESSING APPARATUS
Herbert Huebscher, New Hyde Park, N.Y., assignor, by mesne assignments, to Hazeltine Corporation
Filed May 29, 1968, Ser. No. 732,944
Int. Cl. G01s 9/06
U.S. Cl. 343—15
10 Claims

ABSTRACT OF THE DISCLOSURE

Signal processing apparatus is disclosed which includes two or more non-scanning omnidirectional antennas that receive reply signals from interrogated transponders in a position monitoring system. Circuitry detects and distinguishes the reply signals received from each transponder. A data processor derives equations representative of hypothetical functions corresponding to possible positions of a system transponder and solves the equations to determine the points of intersection of the functions, thereby ascertaining the transponder position. Other embodiments are also covered.

The present invention represents improvements in position monitoring systems such as those of the type described in applicant's copending U.S. application Ser. No. 664,691, filed Aug. 31, 1967, now U.S. Pat. No. 3,474,460 entitled "Position Monitoring System" and which issued on Oct. 21, 1969.

SUMMARY OF THE INVENTION

This invention pertains to signal processing apparatus and more particularly to apparatus for use in a position monitoring system for processing reply signals received from mobile system transponders in order to ascertain the position of each transponder.

Objects of this invention are to provide new and improved signal processing apparatus which is usable in position monitoring systems, and to provide such processing apparatus which is capable of ascertaining the position of mobile transponders without requiring the use of scanning antennas.

In accordance with the present invention, there is provided signal processing apparatus for use in a position monitoring system of the type wherein signals are generated for interrogating a plurality of mobile transponders and wherein reply signals received from each transponder are distinguishable on a time basis from the reply signals of all other systems transponders which comprises antenna means, including a plurality of fixed antennas each having a stationary broad beam radiation characteristic, for receiving reply signals from each transponder and first means responsive to the received reply signals for detecting the reception at each antenna of the reply signals from each transponder. The system also includes second means responsive to the detected reply signals for generating coded signals which distinguish the reply signals received from each transponder on a time basis from the reply signals of all other system transponders and processing means responsive to the coded signals for processing said coded signals for ascertaining the position of each transponder.

Referring to the drawings:

FIG. 1 is an over-all perspective view of a position monitoring system which includes one form of signal processing apparatus in accordance with the invention.

FIG. 2 is a block diagram of one form of signal processing apparatus in accordance with the invention, shown operating in conjunction with transmitting circuitry.

FIGS. 3a, 3b, and 3c depict several possible circuitry variations for the signal processing apparatus of FIG. 2.

Figure 4A:
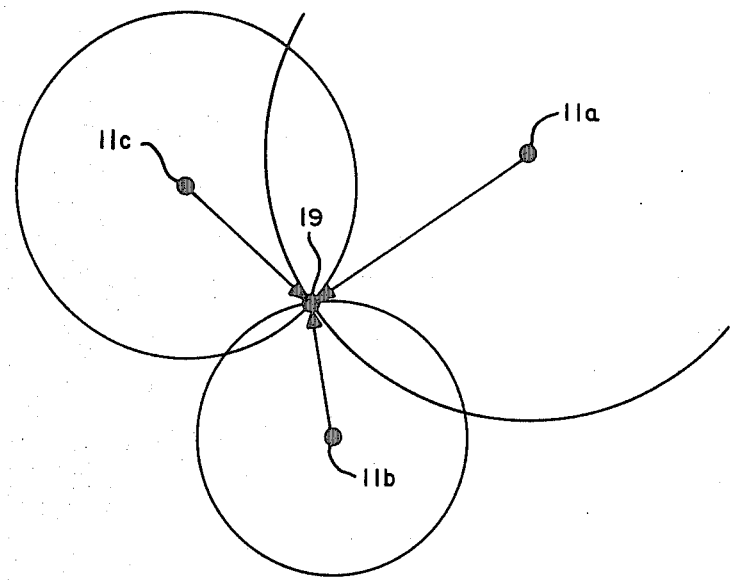
Figure 4B:
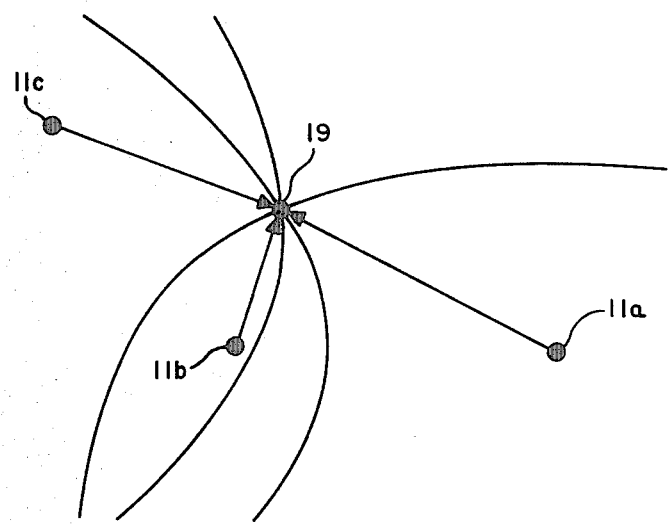
Figure 4C:
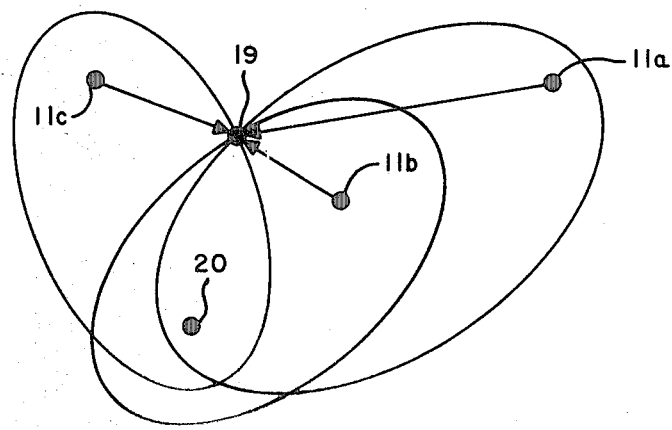

FIGS. 4a, 4b, and 4c are representations of results effected by the respective FIG. 3a, FIG. 3b, and FIG. 3c circuitry variations.

Description of the invention

There is shown in FIG. 1 a perspective view of a position monitoring system which includes one form of signal processing apparatus 10 in accordance with the invention. In this particular embodiment apparatus 10 includes tower mounted antennas 11a, 11b, and 11c, with the associated circuitry for apparatus 10 being located in a central station which is contained within one of the towers. The antennas may be coupled to the apparatus 10 circuitry by cables, microwave links, or the like.

Signal processing apparatus 10 is depicted in greater detail in FIG. 2. Here, apparatus 10 comprises antenna means 11, shown as a plurality of fixed antennas each having a stationary or non-scanning broad beam radiation characteristic for receiving relay signals from each transponder. In particular, these antennas are depicted as omnidirectional antennas 11a, 11b, and 11c, one or more of which, when system operation permits, may be designed for alternatively transmitting and receiving thereby obviating the need for a separate transmitting antenna. FIG. 2 depicts antennas 11a, 11b, and 11c as omnidirectional for receiving reply signals from transponders located at any positions relative to these antennas. However, depending on where the antennas are physically positioned relative to the geographical boundaries of the system, broadly directional antennas may instead be utilized. In addition, although three antennas are shown in FIG. 2, various embodiments of signal processing apparatus 10 will only require two antennas such as 11a and 11b.

Processing apparatus 10 also includes first means, shown as detection circuitry 13 responsive to the received reply signals, for detecting the reception at each antenna 11a, 11b and 11c of the reply signals from each transponder; and second means, shown as identification circuitry 14 responsive to the detected reply signals, for generating coded signals which distinguish the reply signals received from each transponder on a time basis from the reply signals of all other system transponders.

Signal processing apparatus 10 further includes processing means, depicted as data processor 15 responsive to the generated coded signals, for processing the coded signals for ascertaining the position of each transponder. Processor 15 is shown to comprise third means, function deriving circuitry 16, for deriving equations representative of hypothetical functions which correspond to possible positions of the transponder relative to the antennas 11a, 11b and 11c; and fourth means, function intersection determining circuitry 17, for solving the equations to determine the points of intersection of the hypothetical functions for ascertaining the position of the transponder. Transponder positional signals may then be generated and supplied to any desired apparatus such as, for example, a display 18.

FIGS. 3a, 3b, and 3c, and the corresponding illustrations of FIGS. 4a, 4b, and 4c each, for convenience, depict one particular type of function deriving circuitry 16 and the corresponding function intersection determining circuitry 17.

Specifically, FIG. 3a depicts circle equation deriving circuitry 16a for determining the range from transponder 19 to the antennas 11a, 11b or 11c for deriving equations representative of hypothetical range circles, each of which corresponds to possible transponder 19 positions relative to a different one of the antennas 11a, 11b, and 11c. Also shown in FIG. 3a is circle intersection determining circuitry 17a for solving the derived equations to determine the points of intersection of the range circles for ascertaining the position of the transponder 19.

Similarly, FIG. 3b depicts circuitry 16b for deriving equations representative of hypothetical hyperbolic functions, each of which corresponds to the possible positions of one transponder 19 relative to a different pair of the antennas 11a, 11b, and 11c. Since there are three different antenna pairs, namely 11a–11b, 11a–11c, and 11b–11c, three different hypothetical hyperbolic functions may be derived for each system transponder 19. FIG. 3b also shows circuitry 17b for solving the derived equations representative of the hyperbolic functions to determine the points of intersection of the functions for ascertaining the position of the transponder 19. In solving the equations, circuitry 17b also eliminates the portion of the hyperbolic function which represents an "impossible" transponder 19 position.

In like manner, FIG. 3c shows circuitry 16c for determining the over-all range or sum of each of the two ranges from a predetermined location, such as the location of a transmitting antenna 20, to the transponder 19 and thence to one of the receiving antennas 11a, 11b, or 11c. This over-all range determination is made with respect to each of antennas 11a, 11b, and 11c for deriving equations representative of hypothetical ellipses. Each of the hypothetical ellipses corresponds to the possible positions of one transponder 19 relative to the transmitting antenna 20 and a corresponding one of the antennas 11a, 11b, and 11c. Thus, in a system having antennas 11a, 11b, and 11c, three such equations may be derived for each system transponder 19. FIG. 3c also depicts circuitry 17c for solving the derived equations to determine the points of intersection of the ellipses for ascertaining the position of the transponder 19.

System operation

Since signal processing system 10 is discussed for use with position monitoring systems, where deemed appropriate brief references to such systems are included herein.

For purposes of explanation, assume transmitting circuitry 12, as shown in FIG. 2, supplies an interrogation signal to transmitting antenna 20 for interrogating transponder 19 which may be located in vehicles whose positions are to be monitored. Although only one vehicle is shown in FIG. 1, it is clear that any number of vehicles having transponders 19 may be included in a system.

The transmitted interrogation signal may be of the type described in applicant's copending patent application heretofore mentioned. One such interrogation signal contains a plurality of pulses, predetermined ones of which each cause a corresponding predetermined one of the transponders 19 to generate a reply signal immediately upon reception thereof. The interrogation pulses are transmitted sufficiently apart in time to permit reception of the responding transponder's 19 reply signals by antenna means 11 before transmission of the next pulse, regardless of the transponder 19 position within the range of the system. Thus, a reply signal from each transponder 19 is received within a predetermined unique time interval assigned to that transponder 19.

However, it is clear that signal processing apparatus 10 is also usable with position monitoring systems having no specific interrogation signal at all, provided that the transponders 19 are appropriately designed. One such design would include each transponder 19 having a master clock and timing circuitry which can be operated in synchronism with identification circuitry 14 so that the reply signals from each particular transponder 19 are received at the antennas 11a, 11b, and 11c of antenna means 11 within the predetermined unique time interval assigned to that transponder 19. Irrespective of whether or not an interrogation signal is actually transmitted, identification circuitry 14 generates coded signals which distinguish the reply signals received from each transponder 19 on a time basis from the reply signals of all other transponders 19 in the system.

Operation with circuitry of FIG. 3a

With reference to the signal processing apparatus 10 having units 16a and 17a of FIG. 3a, transmitting antenna 20 is shown physically combined in FIG. 1 with omnidirectional antennas 11a, 11b, and 11c. In what may be referred to as a first interrogation sequence, the interrogation signal is physically transmitted from antenna 11a and causes each transponder 19 to transmit reply signals in response thereto. Detection circuitry 13 has three diode detectors, each responsive to signals received at one of antennas 11a, 11b, or 11c. However, in this embodiment, circuitry 13 detects only the reception of the transponder 19 reply signals at antenna 11a so that one appropriately switched diode detector is sufficient. Identification circuitry 14, shown coupled to transmitting circuitry 12, is responsive to the transmission of each interrogation signal pulse, the predetermined pulse sequencing, and the detected reply signals. Identification circuitry 14 includes timing circuitry to identify which particular transponder 19 is replying in each time interval and gating circuitry connected to the timing circuitry and responsive to the detected reply signal for generating coded signals to be supplied to data processor 15 and which distinguish the reply signals received from each system transponder 19 on a time basis. If desired, the gating circuitry could, alternatively, be included in data processor 15.

It is well known in the radar art that range information can be derived from the elapsed time between transmission of an interrogation signal and reception of a reply signal which was transmitted in response thereto by a transponder such as transponder 19. This range information or data is contained within the coded signals supplied to processor 15. The information is stored such as at prescribed locations in the memory (not shown) of data processor 15, and read out as needed. In response to this data, circle deriving circuitry 16a of data processor 15 derives an equation representative of a hypothetical range circle which corresponds to possible positions of one transponder 19 relative to antenna 11a whose physical location is represented by the center of the circle. Like equations are then derived from each transponder 19 in the system.

The aforementioned sequence of interrogating each transponder 19 and receiving reply signals therefrom in predetermined time intervals is now repeated in a second sequence with antenna 11b alternatively functioning as the transmitting and receiving antenna and located at the center of the circle. Likewise, a third sequence is repeated with antenna 11c. Circle deriving circuitry 16a thus sequentially derives equations representative of hypothetical range circles which correspond to possible positions of each transponder 19 relative to each of antennas 11a, 11b, and 11c. These equations can be stored at appropriate locations in the memory of data processor 15.

The three equations representing possible positions of one particular transponder 19 relative to each of antennas 11a, 11b and 11c, respectively, are now read out of memory and circle intersection determining circuitry 17a solves the three equations to determine the points of intersection of the three hypothetical circle functions, thereby ascertaining the position of the particular transponder 19. This is repeated to ascertain the position of each transponder 19 in the system. Signals may then be developed for displaying each transponder 19 as a "blip" on a radar-type plan position indicator (PPI) display such as display 18. Alternatively, the transponder 19 locations may be translated into a numerical format for use in other type displays or merely stored in predetermined locations of the memory of data processor 15.

It should be noted that three non-scanning antennas 11a 1b and 11c have been utilized in the above configuration. Actually, only two antennas such as 11a and 11b are required. In the latter instance, as can be readily ascertained from FIG. 4a, the use of two antennas permits obtaining two range circles per system transponder 19 rather than three. This may result in having two different points of intersection or "possible locations" for each transponder 19. However, if one such location can be eliminated, as occurs, for example, when the approximate location of a transponder 19 is known, a two antenna system will suffice.

Operation with circuitry of FIG. 3b

Referring now to the signal processing apparatus 10 which includes units 16b and 17b of FIG. 3b, transmitting circuitry 12 generates an interrogation signal which is transmitted to each transponder 19 via one antenna. This antenna, for example, may be either antenna 11a, 11b, or 11c alternatively operating as transmitting and receiving antennas. Otherwise, separate transmitting antenna 20 may be utilized.

For convenience, assume that antenna 11a is utilized to alternatively transmit and receive. Detection circuitry 14 detects the reception of the reply signals received from a particular transponder 19 at each of the antennas 11a, 11b, and 11c. In this embodiment, although an interrogation signal is transmitted only from one location, all three receiving antennas 11a, 11b, and 11c receive replies in response thereto. Therefore, in response to one interrogation signal, detection circuitry 13 detects reply signals from one system transponder at all three antennas 11a, and 11c. However, the reply signals are received at all three antennas within the one unique time interval assigned to that transponder 19.

Identification circuitry 14 is responsive to the three detected reply signals from each transponder 19 and, in a manner analogous to that described with reference to the previous embodiment, supplies coded signals to data processor 15. These signals, which may be stored in memory, distinguish the reply signals received from each transponder 19 on a time basis and also indicate the particular antenna 11a, 11b or 11c at which the replies were received. Similar coded signals are also generated and stored with regard to reply signals received from each system transponder 19.

The coded signals for a particular transponder 19 relative to two antennas such as antenna pair 11a–11b are read out of memory. Circuitry 16b now determines the difference in the relative time of reception at antenna 11a and antenna 11b of the reply signals for this particular transponder 19. Then, utilizing conventional techniques employed in hyperbolic navigation and surveying systems such as LORAN and DECCA, circuitry 16b derives an equation representative of a hypothetical hyperbolic function which corresponds to possible positions of this particular transponder 19 relative to the antenna pair 11a–11b. This equation is then stored in memory and the technique repeated to derive an equation representative of a hypothetical hyperbolic function for that particular transponder 19 relative to antenna pair 11a–11c, and, subsequently, relative to antenna pair 11b–11c. These equations may also be stored in memory and the entire procedure repeated for each particular transponder 19 in the system.

The equation derived for each of the three antenna pairs, relative to one particular transponder may now be read out of memory. Hyperbolic intersection determining circuitry 17b solves these three equations, eliminating any "impossible" solutions, to determine the points of intersection of the hypothetical hyperbolic functions for ascertaining the position of this particular transponder 19. The resulting location of transponder 19, pictorially shown in FIG. 4b, may be stored in memory or displayed as previously described. Only two equations need be derived and solved if any resulting ambiguity which indicates more than one "possible" location for each transponder 19 can be eliminated. The entire procedure is now repeated for each of the other transponders 19 in the system, thereby ascertaining the position of each system transponder 19.

It should be noted that in LORAN-type systems a transponder such as transponder 19 and associated circuitry is often used by the pilot of an airplane to determine his position relative to known fixed antennas. In the embodiment previously described, however, these conventional techniques are utilized by signal processing apparatus 10 to ascertain the position of each transponder 19 in the system relative to the known fixed positions of antennas 11a, 11b and 11c.

Operation with circuitry of FIG. 3c

Referring to the signal processing apparatus 10 having units 16c and 17c of FIG. 3c, transmitting antenna 20 is positioned at one known location and antennas 11a, 11b, and 11c, which in this instance are utilized only as receiving antennas, are each positioned at various different known locations.

Assume transmitting circuitry 12 causes transmitting antenna 20 to transmit a pulsed interrogation signal to the system transponders 19 so that the reply signals from each system transponder 19 are received at all three antennas 11a, 11b, and 11c. Detection circuitry 13, having three diode detectors, each of which is responsive to signals received at a different one of antennas 11a, 11b, or 11c, detects the reception of the reply signals at each of the respective antennas 11a, 11b, and 11c. Identification circuitry 14, analogous to that described in the previous embodiments, is responsive to the detected reply signals and generates coded signals which distinguish the reply signals received from each transponder 19 on a time basis from all other system transponders 19. These signals are stored in the memory of data processor 15, and read out as required for use by circuitry 16c.

The time between transmission of the interrogation signal pulse by transmitting antenna 20 and the reception of the reply signals transmitted by a particular transponder 19 in response thereto and received at each of antennas 11a, 11b, and 11c, is representative of the over-all range or the sum of the ranges between (1) transmitting antenna 20 to transponder 19, and (2) transponder 19 to the corresponding one of the receiving antennas 11a, 11b, or 11c. Utilizing conventional techniques such as employed in LORAN and referred to previously, circuitry 16c then derives an equation representative of a hypothetical elliptical function which corresponds to possible positions of that particular transponder 19 relative to the transmitting antenna 20 and one of the antennas 11a, 11b, or 11c. Equations represenative of three separate functions, one with respect to each of antennas 11a, 11b and 11c are thus derived for each particular transponder 19. Transmitting antenna 20 together with a different one of the antennas 11a, 11b, and 11c, represent the locii of each ellipse.

The three equations are read out of memory, and solved by circuitry 17c to determine the points of intersection of the ellipses for ascertaining the position of transponder 19.

This technique is now repeated with regard to the other transponders 19 in the system to ascertain their respective positions. FIG. 4c depicts one particular set of three ellipses and the points of intersection which determine the position of one particular transponder 19.

A variation of the previously described operation of the circuitry of FIG. 3c is as follows: Since transmitting antenna 20 is remote from antennas 11a, 11b, and 11c, interrogation signal pulses will also be received at antennas 11a, 11b, and 11c. Detection circuitry 13 is now designed to additionally detect the reception of each interrogation signal pulse. Identification circuitry 14 is designed to additionally be responsive to the detected interrogation signal pulses and generate coded signals which additionally indicate when the reply signals from each transponder 19 are received at each of the antennas 11a, 11b, and 11c, relative to the reception at the same ones of said antennas of the detected interrogation signals. Since the range between transmitting antenna 20 and each of antennas 11a, 11b, and 11c is known, the time between reception of the interrogation signal pulse by a particular antenna means 11 and the reception of the reply signal transmitted by a particular transponder 19 in response thereto and received at that same antenna of antenna means 11, circuitry 16 may be designed to derive the heretofore referenced elliptical equation. This system operation then is the same as previously described.

In lieu of transmitting circuitry 13 generating the interrogation signals transmitted via transmitting antenna 20, the transmission from a local television station may instead be utilized as an interrogation signal. Horizontal TV sync pulses might then represent individual transponder 19 interrogation signals with predetermined vertical sync pulses being utilized for synchronization.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Signal processing apparatus for use in a position monitoring system of the type wherein signals are generated for interrogating a plurality of mobile transponders and wherein every interrogated transponder generates a reply signal in response to each interrogation signal received thereby and the reply signal from each transponder is received within a unique time interval prescribed for that transponder, said apparatus comprising:

antenna means, including a plurality of fixed antennas, each having a stationary broad beam radiation characteristic, for receiving reply signals from the transponders;

first means responsive to the received reply signals for detecting the reception at each antenna of the reply signal from each transponder;

second means coupled to said antennas and responsive to the times of reception, with respect to each other, of the transponder reply signal detected at each of said antennas for generating coded signals for distinguishing the replies on the basis of each transponder reply being received in a unique time interval prescribed for that transponder relative to said interrogation signal;

third means coupled to said second means and responsive to the time difference between said detected signals for deriving equations representative of hypothetical functions which correspond to possible positions of the transponder relative to said antennas;

and fourth means for solving said equations to determine the points of intersection of said hypothetical functions for ascertaining the positions of the transponder.

2. Signal processing apparatus as described in claim 1, wherein each of said fixed antennas has a substantially omni-directional radiation characteristic for receiving reply signals from transponders located at any position relative to said antennas.

3. Signal processing apparatus as described in claim 1, wherein said third means derives equations representative of hypothetical hyperbolic functions, each of which corresponds to possible transponder positions relative to a different pair of said antennas, and said fourth means solves said equations to determine the points of intersection of said hyperbolic functions for ascertaining the position of the transponder.

4. Signal processing apparatus for use in a position monitoring system of the type wherein signals are generated for interrogating a plurality of mobile transponders and wherein every interrogated transponder generates a reply signal in response to each interrogation signal received thereby and the reply signal from each transponder is received within a unique time interval prescribed for that transponder, said apparatus comprising:

first and second fixed antennas, each having a stationary broad beam radiation characteristic, for receiving reply signals from the transponders;

first means responsive to the received reply signals for detecting the reception at each antenna of the reply signal from each transponder;

second means responsive to the detected signals for generating coded signals for distinguishing the replies on the basis of each transponder reply being received in a unique time interval prescribed for that transponder relative to said interrogation signal;

third means responsive to the coded signals for determining the range from the transponder to said antennas for deriving equations representative of two hypothetical range circles, each of which corresponds to possible transponder positions relative to a different one of said antennas;

and fourth means for solving said equations to determine the points of intersection of said range circles for ascertaining the position of the transponder.

5. Signal processing apparatus as described in claim 4, which additionally includes a third fixed antenna having a stationary broad beam radiation characteristic, for receiving reply signals from each transponder; and wherein said third means derives equations representative of three hypothetical range circles.

6. Signal processing apparatus for use in a position monitoring system of the type wherein signals are generated for interrogating a plurality of mobile transponders and wherein reply signals received from each transponder are distinguishable on a time basis from the reply signals of all other system transponders, comprising:

first and second fixed antennas, each having a stationary broad beam radiation characteristic for receiving reply signals from each transponder;

first means responsive to the received reply signals for detecting the reception at each antenna of the reply signals from each transponder;

second means responsive to the detected reply signals for generating coded signals which distinguish the reply signals received from each transponder on a time basis from the reply signals of all other system transponders;

third means responsive to the coded signals for determining the sum of the range from a predetermined location to the transponder and the range from the transponder to a selected one of said antennas, for different selected ones of said antennas, for deriving equations representative of hypothetical ellipses, each of which corresponds to possible transponder positions relative to said predetermined location and a different selected one of said antennas;

and fourth means for solving said equations to determine the points of intersection of said ellipses for ascertaining the position of the transponder.

7. Signal processing apparatus as described in claim 6, wherein said fixed antennas are additionally responsive to a transmitted interrogation signal; said first means additionally detects the reception at each antenna of said interrogation signal; and said second means is additionally responsive to the detected interrogation signal for generating said coded signals which additionally indicate when the reply signals from each interrogated transponder are received at said antennas relative to reception at the same ones of said antennas of the detected interrogation signal.

8. Signal processing apparatus as described in claim 6, which additionally includes a third fixed antenna having a stationary broad beam radiation characteristic, for receiving the reply signals from each transponder; and wherein said third means derives equations representative of three hypothetical ellipses.

9. Signal processing apparatus for use in a position monitoring system of the type wherein signals are generated for interrogating a plurality of mobile transponders and wherein every interrogated transponder generates a reply signal in response to each interrogation signal received thereby and the reply signal from each transponder is received within a unique time interval prescribed for that transponder, said apparatus comprising:

first, second and third fixed antennas, each having a stationary broad beam radiation characteristic, for receiving reply signals from the transponders;

first means, responsive to the received reply signals for detecting the reception at each antenna of the reply signal from each transponder;

second means coupled to said antennas and responsive to the times of reception, with respect to each other, of the transponder reply signal detected at each of said antennas for generating coded signals for distinguishing the reply signal received from each transponder on a time basis from the reply signals of all other system transponders;

third means coupled to said second means and responsive to the time difference between said detected signals for deriving equations representative of hypothetical hyperbolic functions, each of which corresponds to possible transponder positions relative to a different pair of said antennas;

and fourth means for solving said equations to determine the points of intersection of said hyperbolic functions for ascertaining the position of the transponder.

10. Signal processing apparatus for use in a position monitoring system of the type wherein signals are generated for interrogating a plurality of mobile transponders and wherein reply signals received from each transponder are distinguishable on a time basis from the reply signals of all other system transponders, comprising:

antenna means, including a plurality of fixed antennas each having a stationary broad beam radiation characteristic, for receiving the reply signals from the transponders;

first means responsive to the received reply signals for detecting the reception at each antenna of the reply signal from each transponder;

second means responsive to the detected reply signals for generating coded signals which distinguish the reply signal received from each transponder on a time basis from the reply signals of all other system transponders;

third means responsive to the coded signals for determining the difference in range from a predetermined location to said antennas and from said predetermined location to said antennas and from said predetermined location to the transponder to said antennas for deriving equations representative of hypothetical ellipses, each of which corresponds to possible transponder positions relative to said predetermined location and a different one of said antennas;

and fourth means for solving said equation to determine the points of intersection of said ellipses for ascertaining the position of the transponder.

References Cited
UNITED STATES PATENTS

| | | | |
|---|---|---|---|
| 2,515,332 | 7/1950 | Budenbom | 343—15 |
| 2,857,592 | 10/1958 | Hoffman | 343—15 |
| 2,972,742 | 2/1961 | Ross | 343—112 |
| 3,068,473 | 12/1962 | Muth | 343—112 |

RODNEY D. BENNETT, JR., Primary Examiner

R. E. BERGER, Assistant Examiner

U.S. Cl. X.R.

343—6.5, 112